United States Patent [19]

Dammer

[11] 4,121,730
[45] Oct. 24, 1978

[54] SCREW CLOSURES FOR THERMALLY-INSULATING CONTAINERS

[75] Inventor: Horst Dammer, Schlitz-Unterschwarz, Germany

[73] Assignee: Dr. Anso Zimmermann Isolierflaschen, Niederaula, Germany

[21] Appl. No.: 731,836

[22] Filed: Oct. 12, 1976

[30] Foreign Application Priority Data

Oct. 28, 1975 [DE] Fed. Rep. of Germany ....... 2548199

[51] Int. Cl.² ............................................. B65D 51/16
[52] U.S. Cl. .................................... 215/310; 215/307; 215/314; 215/356
[58] Field of Search ................ 215/307, 310, 314, 356

[56] References Cited

U.S. PATENT DOCUMENTS

| | | | |
|---|---|---|---|
| 1,131,304 | 3/1915 | Williamson | 215/307 |
| 2,946,491 | 7/1960 | Bramming | 215/314 |
| 3,162,319 | 12/1964 | Lee | 215/307 |
| 3,809,275 | 5/1974 | Ek | 215/314 |
| 4,033,472 | 7/1977 | Aichinger | 215/356 |

Primary Examiner—Ro E. Hart
Attorney, Agent, or Firm—Scully, Scott, Murphy & Presser

[57] ABSTRACT

The invention relates to screw closures for thermally-insulating containers. Each closure has a portion adapted to project into an opening of an inner, thermally-insulating vessel of the container, there being a flexible part provided on said portion, this part being intended to occupy substantially completely the opening of the inner vessel when the screw closure is introduced into the opening to reduce the possibility of heat transfer occurring in the region of the screw closure.

23 Claims, 6 Drawing Figures

SCREW CLOSURES FOR THERMALLY-INSULATING CONTAINERS

This invention relates to screw closures for thermally-insulating containers.

Screw closures for thermally insulating containers, in particular, jugs, are generally provided with a coarse external thread which can be screwed into a correspondingly coarse thread in a head portion of the container. Often, with a jug, one half turn of the closure in an unscrewing direction is sufficient for raising the closure sufficiently clear of an opening in an inner, heat-insulating vessel so that a sufficiently large discharge opening is uncovered for liquid to flow to a spout of the jug.

In tests with thermally-insulating jugs concerned with retention of heat and cold, it has been found that the greatest heat transfer occurs in the region of the screw closure, which, if having synthetic plastics parts, have a far less favourable heat transfer factor than, for example, standard cork stoppers. There is little improvement even when, as has been tried, the interior of an injection-moulded synthetic plastics part of the screw closure is filled with a material having good heat-insulating properties.

Accordingly, it is an object of the invention decisively to reduce the heat transfer, as compared with known jugs, from the interior of the insulating vessel in the region of the screw closure, so that the liquid can be maintained in a required temperature range by the insulating jug over a substantially longer period.

According to one aspect of the present invention, there is provided a screw closure for a container to seal the contents thereof, the closure having a portion adapted to project into an opening of an inner, thermally-insulating vessel of the container, said portion being provided with a flexible part intended to occupy a said opening substantially completely when the screw closure is introduced into said opening.

According to another aspect of the present invention, there is provided a container comprising an inner, thermally insulating vessel with an opening, a screw closure to screw into a head portion of said container to seal the contents of said vessel, said screw closure having a portion adapted to project into said opening and being provided with a flexible part intended to occupy said opening substantially completely when the screw closure is introduced into said opening.

For a better understanding of the invention and to show how the same may be carried into effect, reference will now be made, by way of example, to the accompanying drawings, in which.

Figure 1:
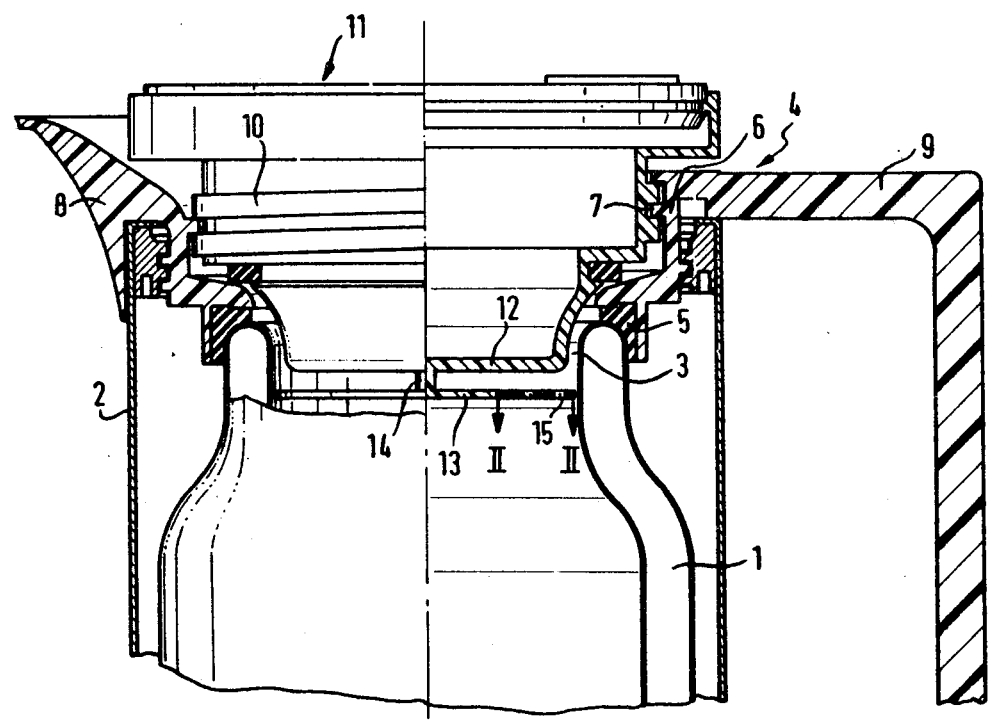
FIG. 1 is a side view of an upper part of a thermally-insulating jug having a first form of screw cap, one half of the view being shown in section.

In the separate constructional forms which are illustrated, identical parts are provided with the same reference numerals and are not repetitively explained. The thermally-insulating jug shown in FIGS. 1, 3 and 5 consists of a heat-insulating vessel 1 and an outer casing 2 which surrounds the vessel 1.

The vessel 1 has an upper opening 3 and, proceeding upwards from this opening, the jug has a head portion 4 which is sealed off from the upper rim of the opening 3 of the insulating vessel 1 by a packing 5 of elastic synthetic plastics material and is secured to the casing 2 in a suitable manner. The head portion comprises a part-cylindrical rim 6 with an internal thread 7, the rim 6 forming a spout 8 on one side of the jug. A handle 9 is provided on the opposite side to the spout 8. Screwed into the internal thread 7 with its coarse external thread 10 is a screw closure or cap indicated generally by reference numeral 11, the cap consisting of an injection-moulded synthetic plastics part with a portion 12 which extends into the opening 3 of the insulating vessel 2 when the cap is introduced into the opening 3.

Figure 2:
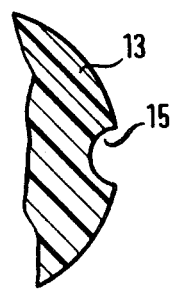
FIG. 2 is a section along the line II—II in FIG. 1.

In the form of cap shown in FIGS. 1 and 2, a thin-walled flexible disc 13 is provided which is spaced from and beneath the portion 12, the disc 13 preferably consisting of the same synthetic plastics material as the plastics part of the cap 11 and being moulded in one piece with the rest of the cap 11 with a web or bar 14 interconnecting the main body of the cap and the disc 13. The disc 13 has an outer periphery which, over a major part thereof, substantially corresponds in shape and dimensions to the cross-sectional form of the opening 3 of the insulating vessel 1, so that the outer edges of the disc 13 lie as close as possible to the inside wall of the insulating vessel 1 in the region of its opening 3.

Visible in FIG. 2 is a small cut-away part or recess 15 which is provided on the circumference of the disc 13 and permits liquid to flow from the interior of the insulating vessel 1 when the cap 11 has been unscrewed by about half a turn, in order to free a passage for the flow of liquid to the spout 8, without necessitating total removal of the cap from the jug.

Figure 3:
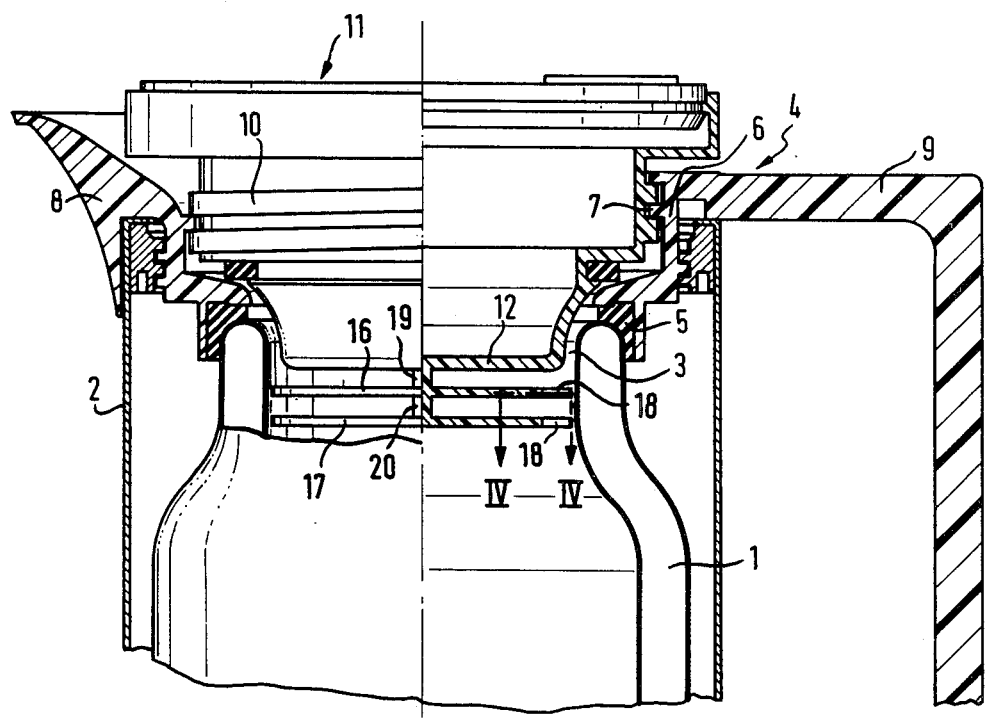
FIG. 3 is a view similar to FIG. 1 of the jug of FIG. 1 but with a second form of screw cap.
Figure 4:
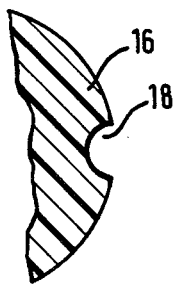
FIG. 4 is a sectional view along the line IV—IV in FIG. 3.

In the form of cap shown in FIGS. 3 and 4, two discs 16 and 17 are provided, these serving a similar purpose to the single disc 13 of FIG. 1, the discs 16 and 17 being parallel to and spaced from one another.

Visible in FIG. 4 are cut-away parts or recesses 18, the function of which corresponds to the recess 15 in FIG. 2. The recesses 18 in the discs 16 and 17 should as far as possible coincide with one another. The discs 16 and 17 are moulded with webs or bars 19, 20 in one piece onto the portion 12 of the plastics part of the cap 11.

Figure 5:
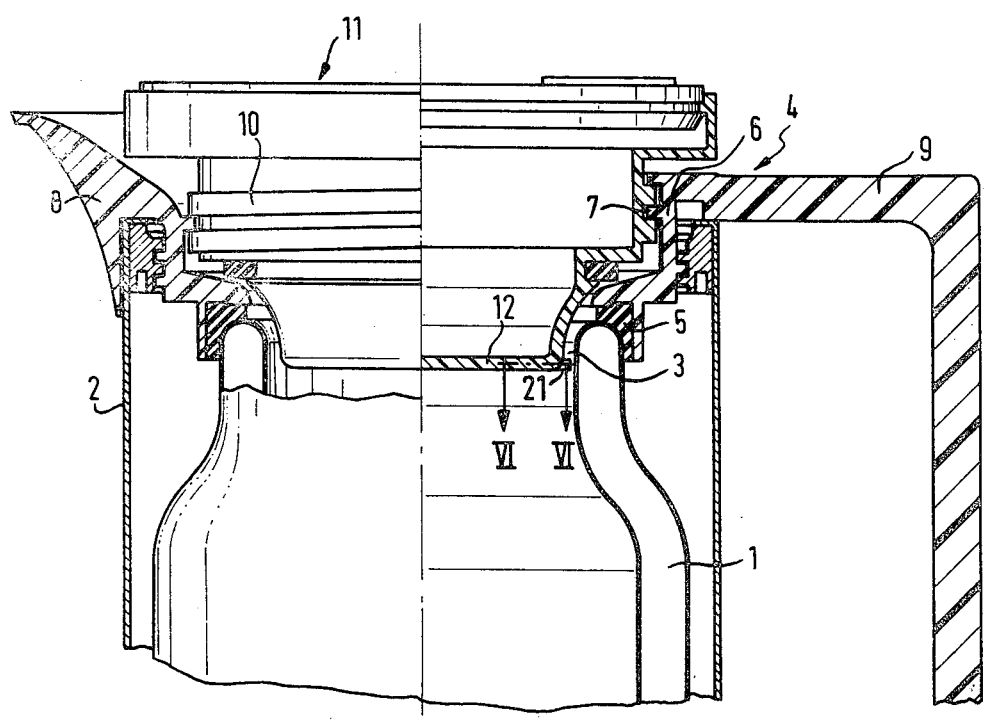
FIG. 5 is a view similar to FIG. 1 of the jug of FIG. 1 but with a third form of a screw cap.
Figure 6:
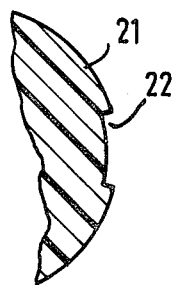
FIG. 6 is a sectional view along the line VI—VI in FIG. 5.

With the third form of cap shown in FIGS. 5 and 6, instead of the disc 13 or discs 16 and 17, a flexible rim 21 is moulded around the periphery of the portion 12 of the screw closure 11, this rim 21 projecting radially outwardly towards the insulating vessel wall in the region of the opening 3. The rim 21 preferably has a thinner wall thickness than the portion 12 and consists of the same synthetic plastics material to make the rim sufficiently flexible. As with the previous forms, the periphery of the rim 21 is intended to lie as close as possible to the inside wall of the vessel 1 in the region of the opening 3 when the cap is introduced into the opening, so that the periphery of the rim over its major part substantially corresponds in shape and dimension to the cross-sectional form of the opening 3 of the vessel 1.

A cut-out part or recess 22 provided on the periphery of the rim 21 can be seen in FIG. 6. This has the same function as the recesses 15, 18 and 18 of the discs 13, 16, and 17, respectively.

I claim:

1. A screw closure for a container to seal the contents thereof, the closure having a portion adapted to project into an opening of an inner, thermally-insulating vessel of the container, said portion being provided with a flexible part intended to occupy the cross-section of said opening substantially completely when the screw closure is introduced into said opening.

2. A screw closure as claimed in claim 1 wherein said portion is of injection-moulded synthetic plastics.

3. A screw closure as claimed in claim 1 wherein said flexible part is a disc carried by said portion.

4. A screw closure as claimed in claim 3 wherein said disc is spaced from said portion.

5. A screw closure as claimed in claim 4 and further comprising a second disc secured to the first mentioned disc in parallel and spaced relationship.

6. A screw closure as claimed in claim 4 wherein said disc is secured to said portion by means of a web.

7. A screw closure as claimed in claim 5 and further comprising a web to secure said first mentioned disc to said portion and a further web to secure said second disc to said first mentioned disc.

8. A closure as claimed in claim 2 wherein said flexible part is of the same synthetic plastics material as said portion and is integrally moulded therewith.

9. A screw closure as claimed in claim 8 wherein said flexible part is a rim surrounding said portion.

10. A screw closure as claimed in claim 9 wherein said rim has a thinner wall thickness than an adjacent wall of said portion.

11. A screw closure as claimed in claim 1 wherein the periphery of said flexible part is provided with a recess to allow for flow of liquid from said vessel.

12. A container comprising an inner, thermally insulating vessel with an opening, a screw closure to screw into a head portion of said container to seal the contents of said vessel, said screw closure having a portion adapted to project into said opening and being provided with a flexible part intended to occupy the cross-section of said opening substantially completely when the screw closure is introduced into said opening.

13. A container as claimed in claim 12 wherein said portion of said screw closure is of injection-moulded synthetic plastics.

14. A container as claimed in claim 12, wherein said flexible part is a disc carried by said portion of said screw closure.

15. A container as claimed in claim 14 wherein said disc is spaced from said portion.

16. A container as claimed in claim 14 and further comprising a second disc secured to the first mentioned disc in parallel and spaced relationship thereto.

17. A container as claimed in claim 15 wherein said disc is secured to said portion of said screw closure by means of a web.

18. A container as claimed in claim 16 and further comprising a web to secure said first mentioned disc to said portion of said screw closure and a further web to secure said second disc to said first mentioned disc.

19. A container as claimed in claim 13 wherein said flexible part is of the same plastics material as said portion of said screw closure and is integrally moulded therewith.

20. A container as claimed in claim 12 wherein said flexible part is a rim surrounding said portion of said screw closure.

21. A container as claimed in claim 20 wherein said rim has a wall thickness which is thinner than an adjacent wall of said portion of said screw closure.

22. A container as claimed in claim 12 and further comprising a packing of elastic synthetic plastics material surrounding and bearing on said opening to provide a sealing action.

23. A container as claimed in claim 12 wherein the periphery of said flexible part is provided with a recess to allow for flow of liquid from said vessel.

* * * * *